June 2, 1931.  G. LANGFORD  1,808,468
METHOD OF MAKING RAIL JOINT BARS
Original Filed April 10, 1929   5 Sheets-Sheet 3

Fig. 13.

Inventor
George Langford
By Brown, Jackson, Boettcher & Diemer.
Attys.

June 2, 1931.  G. LANGFORD  1,808,468
METHOD OF MAKING RAIL JOINT BARS
Original Filed April 10, 1929   5 Sheets-Sheet 4

Inventor
George Langford
By Brown, Jackson, Boettcher & Dienner
Attys.

June 2, 1931.  G. LANGFORD  1,808,468
METHOD OF MAKING RAIL JOINT BARS
Original Filed April 10, 1929   5 Sheets-Sheet 5

Inventor
George Langford
By Brown, Jackson, Boettcher & Dienner
Attys.

Patented June 2, 1931

1,808,468

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

METHOD OF MAKING RAIL JOINT BARS REISSUED

Original application filed April 10, 1929, Serial No. 354,142. Divided and this application filed March 24, 1930. Serial No. 438,276.

My invention relates to bars used in rail joints, and more particularly to a method of reforming such bars.

It is known that in use in the track the head and flange bearing surfaces of the bars wear away at the center one-third or one-fourth of the length of the bars at a much greater rate than at the end portions of the bar. A bar which has been worn in this manner to such an extent as to render it difficult or impossible to obtain a tight fit between the fishing surfaces of the rails and the center portions of the bars is unfit for service and must be replaced. Such a bar can, however, be reformed as to restore its original fishing height at the center portion of the bar or, if desired, in reforming this bar, the center portion thereof can have the fishing height increased beyond its original fishing height, thus providing a crowned bar.

It has been proposed heretofore to reform worn bars by heating them and then subjecting them to pressure inclosed dies, the latter having no provision for properly restoring the heights and widths of head and flange fishing surfaces at the central portion of the bars where wear is greatest, without which provision, the pressure required for reforming is so great as to break even the largest commercial presses. I have conceived the idea of concentrating pressure at the central portion of the bar so as to effect the necessary spread of metal for restoring the fishing height and the worn fishing surfaces at the central portion of the bar, and greatly diminishing the pressure toward and at the end portions, which because of their practically unworn condition require comparatively slight reformed pressure and little or no pressure at their extreme ends.

The tapering of the bar may be applied to the entire section of the bar, or to any one or more of the elements thereof. Such a bar is disclosed in my patent for renewing worn angle bars, Number 1,732,650, issued October 22, 1929.

In forming a tapered bar, such as that above set forth, I use dies having forming surfaces which converge inwardly of the dies in such manner as to obtain the desired spreading of the metal, the pressure of the dies being applied at the central portion of the bar, as the dies are closed, so as to effect the desired spreading action, the end portions of the bar being relieved of pressure and, therefore, not opposing closing of the dies. This renders it possible to readily spread the center portion of the bar to the desired extent and with the application of but relatively small pressure. This has the further advantage that the head and flange fishing surfaces of the bar, particularly at the center portion thereof, are accurately formed and the fishing height of the reformed bar is also accurate, thus assuring accuracy between the fishing of the bar and the fishing of the rail end. This is particularly important at the center portion of the bar, though also of importance at the end portions thereof. The reformed bar may be made thinner but of greater fishing height at center than the original bar, or it may be made thinner in part so as not to decrease the central fishing widths, particularly the head fishing which because of the restriction put upon its width by the narrow rail head gives insufficient head bearing fishing surface and makes any decrease of head fishing width undesirable, particularly at the central portion of the bar where head fishing wear is greatest and where there should be increase rather than decrease in width of fishing contact. This thinning of the central portion of the bar is met in a crowned bar by increase of vertical height so that the reformed bar is capable of withstanding vertical stresses equal to, or even greater than, the stresses which the original bar could withstand. If the reformed bar is restored to its original fishing height, that is, is not crowned, the displacement of metal is slight and there will be no appreciable decrease in strength of the center portion of the bar.

There are short and long angle bars, in use, the former varying from 24 to 28 inches in length, and the latter varying from 36 to 42 inches in length. The greatest stress on the bar is taken up by the center one-third of the short bar and the center one-fourth of the long bar, respectively, the balance being taken up by the end portions of the bar. My invention applies equally to all lengths of bars, though for the purpose of illustration I have shown in the accompanying drawings a short bar. My invention also applies to bars which may be tapered throughout their entire section or to bars one or more elements, only, of which may be tapered.

In practicing my method I employ dies of special construction, the passes and forming walls of which are so related and disposed as to spread the central portion of the bar so as to increase the fishing height of such central portion, this spreading action being accomplished by displacing the metal in such manner as to decrease the thickness of the bar at the central portion, this decrease in thickness being applied either to the whole section of the bar or to one or more selected elements thereof. Constructing the dies in this manner renders it possible to readily reform bars so as to restore or increase the fishing height of the central portion thereof by the application of relatively small or medium pressures. Dies constructed in this manner accomplish a number of purposes. The greatest pressure may be concentrated at the central worn portion of the bar by overcoming the resistance of the less worn portions intermediate between the central portion and ends. The pressure at center may also be applied to effect a greater lateral movement of metal at center, and this pressure may be made to apply first at center, this being followed by waves of pressure from the center to each end. This method of reforming bars by graduated pressure, that is, by applying the greatest pressure at the center portion of the bar and having this pressure decrease toward the ends of the bar, is an important feature of my invention and may be employed for producing either tapered bars such as above described, or untapered bars, as will be hereinafter more fully explained.

My invention has as its main object the restoration of the fishing height and of the fishing surfaces, or the raising of the fishing height at the central portion of a worn bar; also to restore the fishing surfaces of the bar as a whole by holding the end portions of the bar in fishing alignment with the central portion; and, a further object is to effect a graduation of pressure on the worn bar, this pressure concentrating at the center and spreading decreasingly toward or to the ends thereof.

Further objects and advantages of my invention will appear from the detailed description.

This application is a division of my co-pending application for dies for making bars, filed April 10, 1929, Serial Number 354,142.

Figure 1:
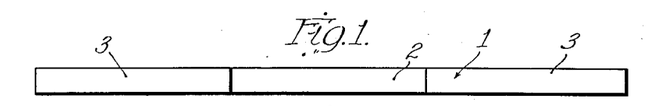
Figure 1 is a plan view of a worn bar.

In Figures 1 to 7 of the drawings I have illustrated, more or less diagrammatically, the problem to be solved. In Figure 1, I have illustrated a flat bar 1, the center portion 2 of which has been worn down at both the top and bottom, at 2ª, to such an extent that the fishing height of this center portion is much less than that of the end portions 3.

Figure 2:
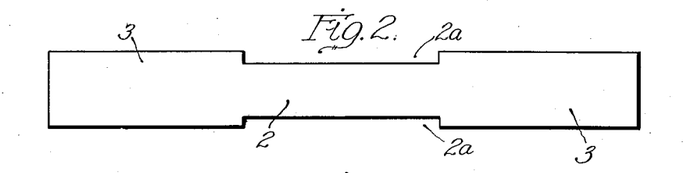
Figure 2 is a side view of the bar of Figure 1.

Figure 2 represents such a bar in side view, this being assumed to be a bar which has been in use for a long time. The amount of wear of the center portion of the bar has been exaggerated so as to be readily perceivable and to more clearly illustrate conditions which exist in practice. The problem is to restore the fishing height of the center portion 2 of the bar to the height of the end portions 3, as in Figure 3, or to provide from the bar of Figures 1 and 2 a bar having a center portion the fishing height of which is greater than that of the end portions, as in Figure 4.

Figure 3:
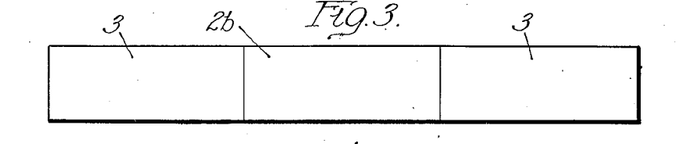
Figure 3 is a side view of a bar having its center portion restored to its original fishing height by reforming a bar such as that shown in Figure 2.
Figure 4:
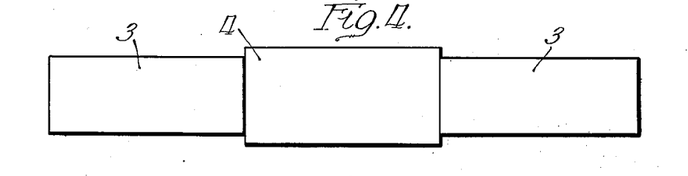
Figure 4 is a side view of a bar having its center portion of increased fishing height so as to be crowned at both the top and the bottom, such a bar being produced by reforming the bar of Figure 2.
Figure 5:
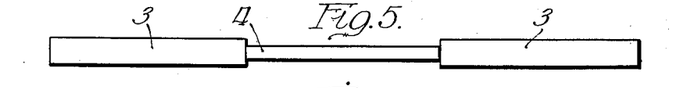
Figure 5 is a plan view of the bar of Figure 4.

In Figure 3, the restored center portion 2$^b$ is equal in fishing height to the end portions, 3, whereas, in Figure 4, the fishing height of the center portion 4 is greater than that of the end portions 3, thus providing a bar crowned at both the top and bottom. To produce the bar of Figure 4 from the bar of Figures 1 and 2, the center portion of the bar is pressed inwardly from the opposite sides thereof, as in Figure 5. By pressing the center portion of the bar to a less extent than in Figure 5, the bar of Figure 3 is produced. It is thus possible to readily restore or increase the fishing height of the center portion of a worn bar, as desired. It will be noted that in Figure 5 the thickness of the end portions 3 of the bar remains unchanged. Also, in this figure, the center portion 4 is illustrated as being pressed inwardly from both sides of the bar, so as to be expanded or spread toward the top and bottom edges of the bar. Obviously, the same result can be accomplished by pressing the center portion of the bar inwardly from one face only.

Figure 6:
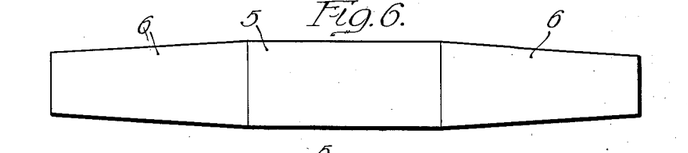
Figure 6 is a side view of a bar reformed in accordance with my invention and crowned at both top and bottom.
Figure 7:
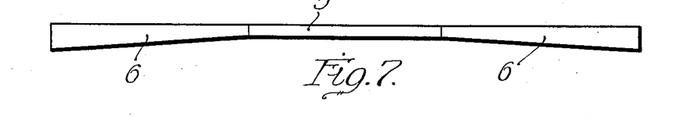
Figure 7 is a plan view of the bar of Figure 6.

In Figure 6 I have shown in side view a bar formed in accordance with my invention. This bar is of greater fishing height at its center portion 5 than at its end portions 6 and tapers to the ends and is, therefore, a crowned bar. The center portion is shown as of uniform height throughout its length, the upper and lower edges thereof being defined by straight lines and the upper and lower edges of the end portions 6 being defined by straight lines which converge toward the ends of the bar and extend from the ends of the center portion 5. As shown in Figure 7, center portion 5 of the bar is approximately of the same thickness as center portion 4 of the bar of Figure 5, and the end portions 6 taper inwardly in thickness from the ends of the bar to the center portion. This produces a tapered bar which can be readily formed in dies, the opposed surfaces of which converge inwardly from each end of the dies, so that the pressure is applied at the center portion of the bar, and the ends of the bar are relieved of pressure to a large extent. I thus obtain a wedging effect of the dies in spreading the metal, so that by applying comparatively small or medium pressure the metal at the center portion of the bar is caused to flow outwardly toward the upper and lower edges thereof, thus reforming the center portion and either restoring fishing surfaces to their original fishing height, or increasing the fishing height of this portion of the bar over its original height.

In practicing my method, the pressure may be concentrated on the center portion of the bar where it is most needed, and decreasing to the ends of the bar where it is least needed, the pressure so applied effecting a greater flow of metal at the central portion of the bar than at the two end portions. This provides a highly efficient method for reforming rail joint bars to restore the fishing surface and height at the center portion thereof, or to increase such fishing height as desired.

Figures 8, 9, 10, 11, 12:
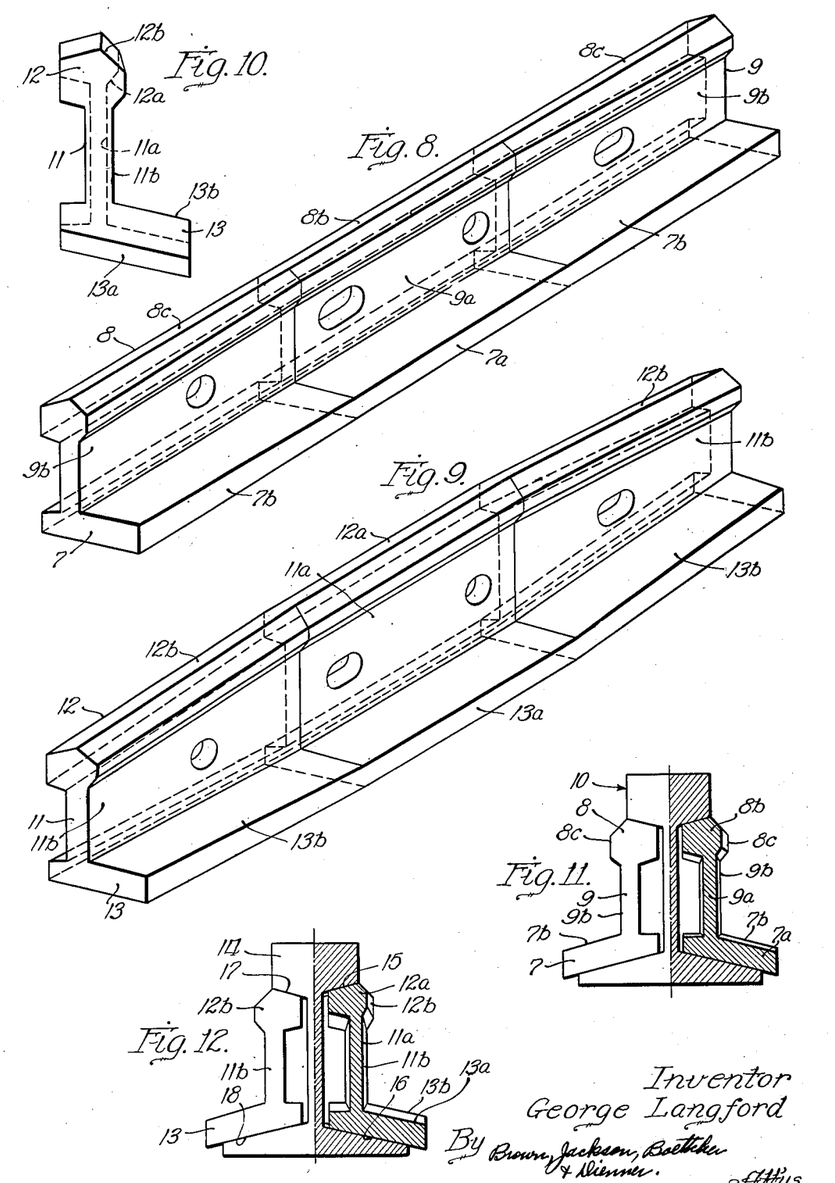
Figure 8 is a perspective outer side view of an uncrowned bar produced in accordance with my invention.
Figure 9 is a view similar to Figure 8 of a crowned bar.
Figure 10 is an end view of the bar of Figure 9.
Figure 11 is an end view of a rail joint illustrating the bar of Figure 8 as applied, one-half of the joint being sectioned at the central vertical plane thereof.
Figure 12 is a view similar to Figure 11 showing the bar of Figure 9 as applied.
Figure 13:
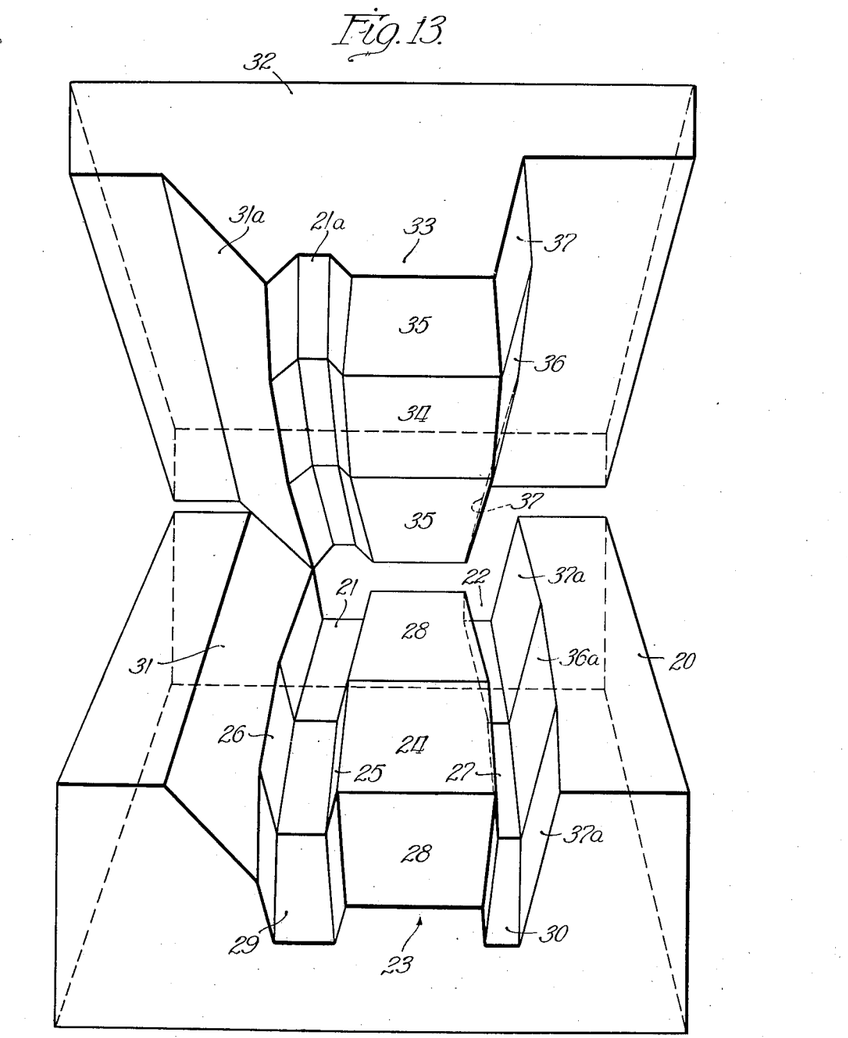
Figure 13 is a perspective view of the dies, the upper die being tilted upwardly away from the lower die.
Figure 14:
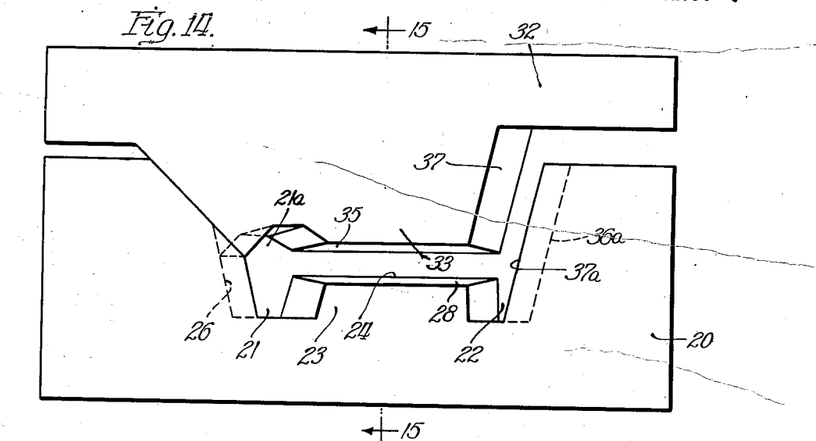
Figure 14 is an end view of the dies in closed position.

In Figure 8, I have illustrated a bar formed in accordance with my method, this bar being produced by reforming a worn bar and restoring the fishing height of the center portion thereof to the same height as the fishing of the end portions of the bar. In this bar, the center portion 7$^a$ of the flange 7 is of less thickness than the end portions 7$^b$ which taper inwardly in thickness from the ends of the bar to the center portion thereof. It will also be noted that the center portion 8$^b$ of the head 8 is of less thickness than the end portions 8$^c$ which taper in thickness from the ends of the bar to the center portion thereof. The center portion 9$^a$ of the web 9 is of less thickness than the end portions 9$^b$ thereof which taper in thickness from the ends of the bar. This will be understood more clearly by reference to Figure 11, which shows two bars similar to that of Figure 8 applied to a rail, one of the bars being shown in end view and the other bar being shown in section, the section being taken at the center of the bar.

As will be noted from this figure of the drawings, center portion 9$^a$ of the web of the bar at the right hand side of rail 10 is appreciably thinner than the end portions 9$^b$ of the web of the bar at the left of the rail. It will also be noted that the center portion 8$^b$ of the head of the right hand bar is appreciably less width and vertical thickness than the end portions 8$^c$ of the head of the bar at the left of the rail.

The center portion 7$^a$ of flange 7 of the right hand bar is of appreciably less vertical thickness than the end portion 7$^b$ of the flange of the left hand bar. It will thus be seen that the bar of Figure 8 has been produced by tapering the entire section of the bar from each end thereof to the center portion of the bar. I thus displace metal from the head and flange of the bar, as well as the web thereof, and cause this metal to flow toward the head and flange of the bar at the center portion thereof so as to restore the fishing height. This is advantageous not only as giving the desired fishing height to the center portion of the bar, but also because it renders available sufficient metal to be redistributed to force the fishing surfaces of the head and the flange, at the center portion of the bar, against the corresponding surfaces of the dies, thus assuring accurate forming of such fishing surfaces.

This is highly important, as these fishing surfaces, particularly at the center portion of the bar, must be accurately spaced and accurately formed for proper bearing contact with the cooperating surfaces of the rails. While I have illustrated and described the bar as being reformed by tapering the entire section thereof from each end toward the center portion of the bar, this is not essential in some cases, as will be later explained, and I do not intend to limit myself to this one method of producing the bar.

The bar illustrated in Figures 9 and 11 may be considered as being produced from a worn bar reformed to restore the original fishing height of the center portion thereof, such bar being initially uncrowned.

This reformed bar is adapted for use with new or unworn rails, it being noted in Figure 11 that the fishing surface of the right hand side of the rail head is at the same height as the fishing surface at the left hand side of the rail head All of the figures of reformed bars so far described may also be considered as illustrative of sections taken across the die cavity when the dies are closed. The amount of thinning of parts or all of grooves at the central portion are accurately measurable in the dies but are difficult to measure in the finished bars for the following reasons.

The ordinary rail joint has take-up space between bar head and rail web of about 3/16", the fishings being so angled that wear of 3/32" in fishing height uses all take-up space and the joint's life is ended. This 3/32" of worn fishing height may be taken as half in the rail ends and half in the bar, so that when the bar has lost 3/64" in fishing height, it is worn out. The head fishing of the bar being generally of less area than the flange fishing, wears most, so that 1/32" may be taken as the bar's head fishing wear, and 1/64" as the bar's flange fishing wear. In reforming, the head and flange fishings are restored independently. Taking the head fishing as the one where movement of metal must be greatest, the problem in reforming to the original fishing height is to move one surface, the head fishing, 1/32" upward.

It can thus be seen that the small amount of wear which makes a bar scrap and the small amounts of thinning various members at center to restore the worn parts of the bar, call for only slight thinning of the die cavity at center, and yet it is these small amounts that mean so much in the proper restoration of the worn fishing surfaces. To thin various members of a die cavity at the central portion so that this thinning is not restricted to any one surface, means that the metal is moved evenly and not distorted in any one place, and that the bar, although thinned at the central portion by a die cavity thinned at the central portion, is not thinned enough to be objected to, the inspection for this in the reformed bar being far less exacting than the close machine work on the dies.

In Figures 9, 10 and 12, I have illustrated a bar formed by the same method as the bar of Figure 8. It will be noted, however, that the bar of Figure 9 is of greater vertical height at its center portion than at its end portions. Center portion 11$^a$ of web 11 is of greater vertical height than end portions 11$^b$ of the web, these end portions of the web tapering in vertical height from the center portion 11$^a$ to the ends of the bar.

It will also be noted, by reference to Figure 10 that the center portion of 12$^a$ of head 12 is of less vertical height and less horizontal thickness than the end portions 12$^b$ which taper in thickness from the ends of the bar to the center portion 12$^a$. The center portion 12$^a$ of the head is higher than the ends of the bar, and the center portion 13$^a$ of flange 13 is of less vertical thickness than the end portion 13$^b$ of the flange, these end portions tapering in thickness from the ends of the bar to the center portion thereof, and the center portion 13$^a$ extends below the end portions 13$^b$. Center portion 11$^a$ of web 11 is of less thickness horizontally than the end portions 11$^b$, as shown in Figure 10, the end portions of the web tapering in thickness from the ends of the bar to the center portion 11$^a$. The bar of Figures 9, 10 and 12 is, in general, formed by the same method as the bar of Figures 8 and 11, except that in the bar of Figure 9 the web tapers vertically as well as horizontally and the center portion of the bar is of greater height than the end portions, thus producing a bar which is crowned both at the head and the flange.

In Figure 12, I have illustrated a rail 14 having two bars constructed as in Figures 9 and 10 applied thereto, one of the bars being shown in end view and the other bar being shown in central section.

As will be noted, the central portion 11$^a$ of the web of the bar at the right hand side of the rail is appreciably higher and thinner than the end portions 11$^b$ of the web of the bar at the left hand side of the rail. It will also be noted that the head fishing surface and the flange fishing surface of the right hand bar are respectively higher and lower than the corresponding surfaces of the left hand bar. This bar is illustrated as applied to a rail 14 which has been in use some time, the center portion of each of the head and flange fishing surfaces 15 and 16, respectively, of the rail having been worn away to a much greater extent than the end portions 17 and 18 of such surfaces, which may be considered as not worn.

This bar is thus well adapted for use with worn rail ends. Under some conditions, a bar constructed in this manner, though not so heavily crowned, may be used with new or slightly worn rail ends, the vertical beveling of the end portions 11$^b$ of the web 11 of the bar permitting the end portions of the bar to be drawn inwardly sufficiently to position the ends of the bar head beneath the rail head.

In forming the bars of Figures 8 and 9, the center portions of the webs of such bars are made thinner than the end portions thereof, the end portions tapering inwardly in thickness to the center portion as previously described and illustrated diagrammatically in Figure 7. In this figure, I have illustrated the bar as being pressed inwardly from one side thereof only, whereas I have illustrated the bars of Figures 8 and 9 as being pressed inwardly or tapered from both sides thereof. Obviously, either method can be employed in forming the bars, that is, the bars can be tapered by being pressed inwardly from either side, or from both sides thereof, as desired, or as conditions may require.

In illustrating the bars differences in height and thickness have been greatly exaggerated to more clearly illustrated my invention. In actual practice, however, the differences may be quite small. In rail joint angle bars, small changes in measurement mean a great deal.

In Figures 13 to 16, I have illustrated a pair of dies for forming bars in accordance with my invention. The lower female die 20 is provided with passes 21 and 22 for reforming the head and the flange, respectively, of a bar. These passes are disposed at opposite sides of a center raised portion or block 23. The center portion 24 of this block is provided with a horizontal upper face and the side edges 25 of this portion are parallel with the side edges of the die. The center portion 26 of pass 21 is parallel with portion 24 of block 23, and the center portion 27 of pass 22 is also parallel with portion 24 of the block. Each end portion 28 of block 23 tapers in width outwardly to the end of the die and the upper face of such end portion is inclined or bevelled downwardly to the end of the die. The end portions 29 and 30 of the passes 21 and 22, respectively, are disposed parallel to end portions 28 of block 23, that is, the end portions of the passes are also inclined downwardly to the ends of the die and the end portions 29 and 30 of the passes at each end of the die converge toward the ends of the die. The die 20 is further provided with an inclined surface 31 extending upwardly and outwardly from the outer edge of pass 21. This die 20 coacts with an upper male die 32 having a block or extension 33, which enters the recess of die 20. The center portion 34 of extension 33 has its under face horizontal and the under face of each end portion 35 of this extension is tapered or inclined upwardly to the end of the die from the center portion 34. Die 32 is provided with a pass 21$^a$ similar to pass 21 of die 20, and with an inclined shoulder 31$^a$ which coacts with surface 31 of die 20 to form a die lock. The end portions 35 of extension 33 taper in width outwardly from the center portion 34 of such extension, and the end portions of pass 21$^a$ are disposed parallel with the end portions 35 of the extension, the center portion of this pass being parallel with center portion 34. Block or extension 33 is provided, at the side thereof remote from pass 21$^a$ with a center forming surface 36 and end forming surfaces 37, the surface 36 being parallel to the adjacent side of die 32 and the surfaces 37 being inclined or tapered inwardly of the die transversely thereof from the surface 36 to each end of the die.

During the first part of the closing movement of the dies, die 32 is shifted laterally away from the flange of the bar, due to contact of surface 36 with the bar flange. In the final closing movement of the dies, the die lock acts to shift die 32 in the direction of the bar flange. This is important as assuring proper and accurate forming of the flange fishing surface, which is the most difficult surface of the bar to accurately form. The tapered passes of the dies, and the die lock, thus cooperate to accurately form the bar with facility.

The surfaces 36 and 37, when the dies are in operative relation, are disposed in parallelism to surfaces 36$^a$ and 37$^a$, respectively, of pass 22 of the lower female die 20. The under face of block 33 of the upper die is convexed downwardly to a greater extent than the upper face of block 23 of the lower die is convexed upwardly as clearly illustrated in Figure 15.

It is to be noted that the passes in the dies taper in depth from each end of the die to the center portion of the pass. These passes also taper in width from the ends of the die to the center portion of the pass, which is narrower horizontally than the end portions of such pass. A bar formed in such a die will be tapered in thickness throughout its entire section from each end to the center portion thereof. This construction of die is thus adapted to produce a bar similar to that illustrated in Figures 9, 10 and 12. In the die structure illustrated, by way of example only, I have shown the passes and forming surfaces as defined by straight lines. I contemplate, however, the use of dies in which the passes and forming surfaces may be formed by arcuate or curved lines, or even stepped lines, if desired. The die structure illustrated and described is by way of example only and, in actual practice, may be varied within wide limits, so as to taper the bar throughout its entire section from the ends to the center portion, or the die may be formed to taper one or more elements of the bar without tapering the entire section thereof. Also, the dies may be so formed as to produce an untapered or straight bar, while obtaining the advantages above pointed out which result from employing graduated pressure in reforming the bar.

While my method is particularly adapted for reforming worn bars so as to render them again useful, it can also be used for forming new bars and I do not, therefore, limit my invention to the reforming of worn bars.

Figure 17:
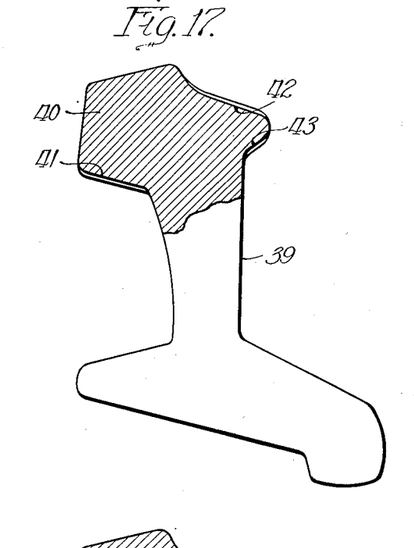
Figure 17 is an end view of a modified form of bar the head portion thereof being sectioned at the center portion of the bar.

In Figs. 17 to 20 of the drawings I have illustrated various ways of applying pressure at the central portion of the different elements of a rail joint bar so as to either restore or increase the height of the fishing at such portion, the inner lines representing graphically pressure at center, and the outer lines, little or no pressure at the ends. In Fig. 17 I have shown a bar 39 of I-beam type in which the center portion of the head 40 thereof has had central pressure applied as at 41 to the under face of the head. This bar may also be pressed centrally at 42 on the outer upper face of the head and, under such conditions, the head may be further centrally pressed as at 43 on the under face of the outer reinforcement for the head, and if the bar is not badly worn and it is desired to restore the height of the fishing, the pressure at 41 is frequently sufficient. In connection with this explanation it will be understood that the words "pressure" and "pressing" used alone without qualification will be taken to mean great pressure applied to the central portion of the bar on the one or more surfaces indicated.

Figure 18:
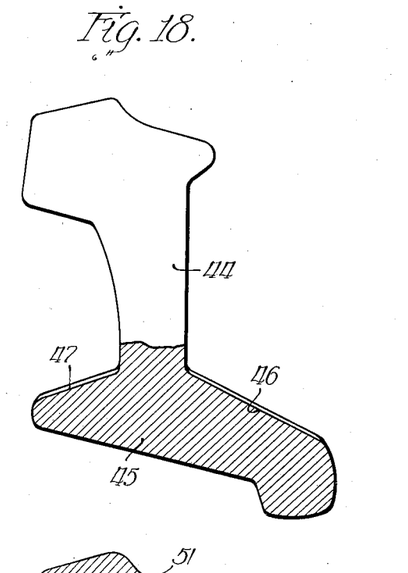
Figure 18 is an end view of another modified form of bar showing the flange portion sectioned at the center of the bar.

In Figure 18, I have illustrated a bar 44, the fishing height of the center portion of which has been restored by pressing the flange 45 at 46 and 47. This pressure on the flange exerted on the upper face thereof causes the metal to flow toward the flange fishing surface of the bar, so as to restore the fishing height at the center portion thereof.

In practice, both portions of the flange 45 may be pressed as illustrated, or either the inner portion or the outer portion of the flange may be pressed. Pressure on the flange is particularly important when applied to the upper and outer portion, as the pressure required in reforming is largely consumed in properly reforming the flange fishing. As the main problem is to properly reform the central portion where the most wear has occurred, pressure along the flange of the bar must be so applied as to effect more spread of metal there than at the ends, or between the central portion and ends. The flange is therefore pressed hard at the central portion, and less from there toward each end, the extreme ends requiring little or no pressure because of their generally unworn condition.

Figure 19:
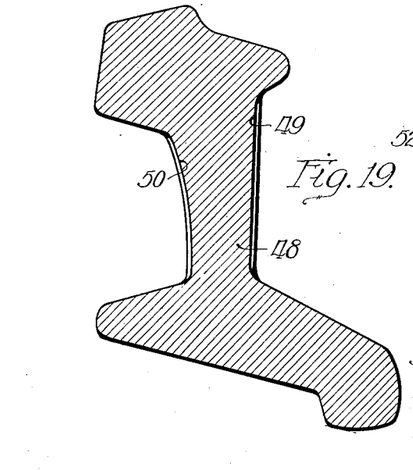
Figure 19 is a view of a third modified form of bar, this view being a section on a vertical plane at the center of the bar.
Figure 20:
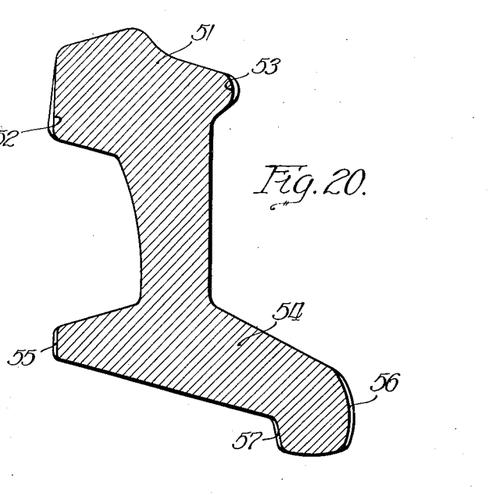
Figure 20 is a central sectional view through a fourth modified form of bar.

The reduction of intermediate and end pressure resistance is therefore equally important as concentration of pressure at center, although both are dependent upon each other and directed toward the same purpose. The flange portion of a bar being thin and broad must have the pressure between center and end reduced so as to reduce the large area of resistance opposing movement of metal at the central portion. The same is true of the broad thin web, although the web does not play the important part in reforming, as does the flange. In Figure 19, I have illustrated a bar in which the fishing height at the center portion has been restored or increased by pressing the web 48. In Figure 20, I have illustrated a bar in which the head 51 has been pressed transversely at 52 and 53, the flange 54 having also been pressed at 55, 56 and 57.

The horizontal pressure on head or flange as in Figure 20 is employed with caution, for it is not good practice to narrow the widths of fishing at center, this being particularly true of the portion which I would prefer to make wider if possible. Moderate narrowing of the fishing may be necessary in some cases but the preferred method, as shown in Figure 20, is to confine thinning of the head to that part which is beneath the head fishing, so that thinning of the head at center is accomplished without narrowing of the head fishing.

It will be clear from the above that my invention comprehends, in its broader aspects, a method by which a bar has its fishing surfaces restored and the fishing height at its center portion either restored or increased, as desired, by graduated pressure, the pressure being greatest at the central portion of the bar and decreasing gradually to the ends, there being little or no pressure at the extreme ends, this pressure applying to several elements of the bar or, if desired, to all of such elements or to any desired combination thereof, in prescribed amounts of depth and length.

Where it is desired to restore the fishing surfaces and fishing height of a bar which is not badly worn, this may be accomplished by pressing one or more of the elements of the bar, as suggested in Figures 17 to 20, inclusive, the tapering off of pressure to the ends in these figures being combined in numerous ways as to amount and extent to produce the desired result. If it is desired to restore the fishing surfaces and fishing height of the central portion of a badly worn bar, I may taper or graduate the pressure variously over the entire section of the bar. Also, I may produce crowned bars which may be crowned both at the head and the flange, or may be crowned at the head only or at the flange only, as conditions may require. It will be obvious that my method provides great control in restoring the fishing surfaces and restoring or increasing the fishing height of the center portion of a bar by decreasingly graduating the reforming pressure on one or more elements of the bar or the entire section of the bar from the central portion to the end portions thereof.

To reduce a fishing surface at the end portions of a bar, there must be relief of pressure at the end portions on one or more surfaces of the bar, otherwise all of the bar surfaces would conform to the die surfaces, and the end fishing surfaces would be similar to the central fishing surfaces, because I have made no provision for narrowing the die fishing surfaces by direct means at the end portions. My invention takes advantage of the relative unimportance of end portion fishing contact with the rail ends compared with the central portion fishing contact, to permit reduction of end portion fishing contact, and to control such reduction by complete relief of pressure on selected surfaces of the bar. For example, taking the bar of Figure 18, if pressure on surfaces 46 and 47 be completely relieved at the end portions of the bar, the flange fishing surface below surfaces 46 and 47 will not be forced to the flange fishing surface of the die's end portions, and the flange fishing surface of the bar will be reduced at the end portions. If surface 46 of Figure 18 be completely relieved from end pressure and surface 47 be only partially relieved as compared with pressure at center, that portion of the flange fishing surface under 46 will not conform to the die, while the portion under 47 does conform to the die, so that flange fishing contact is reduced but not entirely removed. The same procedure may be applied to the head fishing surface on the bar of Figure 17 by complete relief of end pressure on surfaces 41, 42 or 43 or all three, the pressure at center being concentrated to spread the metal where most needed and relieved at the ends, so as to reduce fishing surfaces where so desired.

The complete relief from end pressure on selected surfaces effects more complete concentrated pressure at center than only partial relief from end pressure but may be applied only in such cases where any reduction of end portion fishing contact is permissible. However, the same effect may be gained to some extent by complete relief of end pressure on the web, as at 50 in Figure 19, or by complete relief of end pressure, the length of a surface so relieved being important to secure such effects as may be desired. This method of complete end pressure relief may be applied to intermediate portions of the bar as well as at the end portions, to reduce one or both fishing surfaces between center and ends, or to maintain these intermediate fishing surfaces by only partial relief of pressure. This indirect method of reducing end or intermediate portions of a fishing, while not as accurate as by the direct method of shaping the die surface to the shape of bar surface desired, is nevertheless more or less effective and simple. Unless a bar member has pressure applied to all of its surfaces it will tend to draw away from one or more of the die surfaces and not completely fill it. Ordinarily the reduced fishing surfaces will be restored by wear in a joint to substantially greater contact but may be made so as not to acquire substantially greater contact before the bar's life is ended in a joint.

Figure 15:
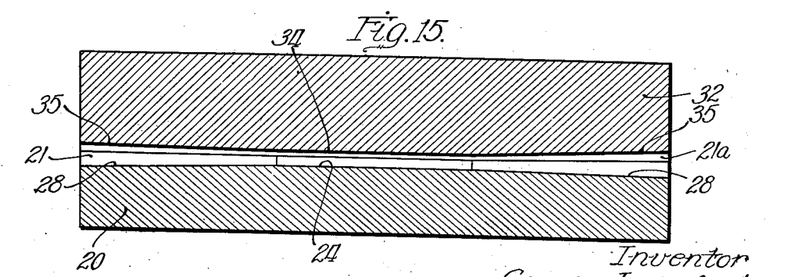
Figure 15 is a section taken substantially on line 15—15 of Figure 14.
Figure 16:
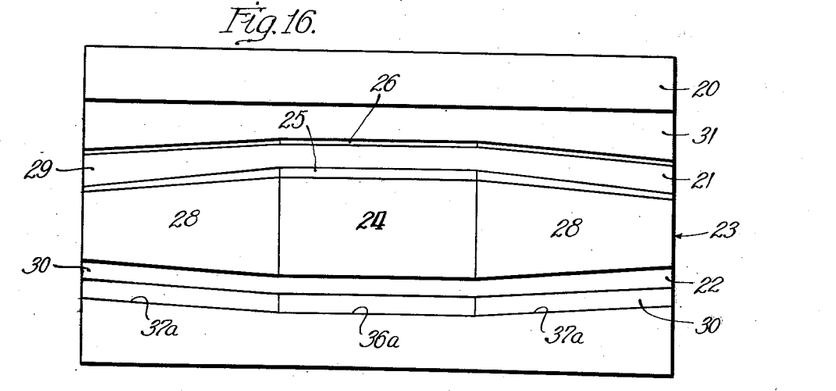
Figure 16 is a plan view of the lower die.

As will be clear from the preceding description and with particular reference to Figure 15, in restoring a worn bar the forming pressure is initially applied to a restricted area of the bar, and the area subjected to pressure progressively increases and is extended toward the ends of the bar in the continued closing of the dies, the pressure at the central portion of the bar increasing simultaneously with the increase in area of the portion of the bar subjected to pressure. In this manner the extent and amount of forming pressure applied to the bar conforms to the extent and amount of wear thereof, and the unworn portions of the bar are not subjected to forming pressure, whereby the bar can readily be formed with greater accuracy and much less pressure than is possible by any of the present methods of reforming with which I am familiar.

Furthermore, while my invention is particularly adapted for reforming angle bars, it may be used for forming bars of other types, several of which are well known in the art, and I do not, therefore, confine my invention to angle bars.

What I claim is:—

1. The method of reforming worn rail joint bars which consists first in heating the bar to a working temperature, and then subjecting it to a forming pressure, the forming pressure being first concentrated at the central portion of the bar to effect a greater displacement of metal at such portion, and then progressively diminishing toward the ends of the bar.

2. The method of reforming worn rail joint bars which consists first in heating the bar to a working temperature and then subjecting it to a forming pressure, the forming pressure being first concentrated at the central portion of the bar to effect a greater displacement of metal at such central portion, selected surfaces toward the ends of the bar being entirely relieved of forming pressure.

3. The method of reforming worn rail joint bars which consists first in heating the bar to a working temperature and then subjecting it to a forming pressure, the forming pressure being greatest and concentrated at the central portion of the bar to effect a greater displacement of metal at such central portion, selected surfaces to the ends of the bar being entirely relieved of forming pressure.

4. The method of reforming worn rail joint bars which consists first in heating the bar to a working temperature and then subjecting it to a forming pressure, the forming pressure being first concentrated and greatest at the central portion of the bar and diminishing towards the ends of the bar, selected surfaces toward the ends of the bar being entirely relieved of forming pressure.

5. The method of restoring the fishing surfaces of a worn rail joint bar, consisting in heating the bar and subjecting it to forming pressure, said forming pressure being concentrated at the central portion of the bar and decreasing in graduated amount to the ends so as to effect a maximum spread of metal at the central portion of the bar decreasing in graduated amount to the ends, without material change of the worn bar's cross-section except in the restored positions of the fishing bearing members at the central portion of the bar.

6. The method of reforming the fishing surfaces of a worn rail joint bar consisting in heating the bar and subjecting it to forming pressure, said forming pressure being concentrated at the central portion of the bar and decreasing at the end portions, prescribed lengths of selected surfaces of the fishing surface members of the end portions of the bar being entirely relieved of pressure, thereby effecting a maximum movement of metal at the central portion of the bar and a minimum movement of metal at prescribed lengths of the end portions to the fishing surfaces so as to secure substantially full rail fishing contact surfaces at the central portion of the bar and reduced rail fishing contact surfaces at the end portions.

7. A method of reforming angle-type rail joint bars which includes the steps of heating the bar, and subjecting the central portion of the foot flange to forming pressure on its upper outer side, said forming pressure being progressively eased towards the ends of the flange.

8. The method of making rail joint bars which consists in heating the bar to a working temperature and then subjecting it to a forming pressure, the forming pressure being first concentrated at the central portion of the bar to effect a greater displacement of metal at such portion, and then progressively diminishing toward the ends of the bar.

In witness whereof, I hereunto subscribe my name this 21st day of March, 1930.

GEORGE LANGFORD.

DISCLAIMER 1,808,468.—*George Langford*, Joliet, Ill. METHOD OF MAKING RAIL JOINT BARS.
Patent dated June 2, 1931. Disclaimer filed May 5, 1937, by the assignee,
*McKenna Process Company of Illinois*, the patentee joining and concurring.

Hereby enters this disclaimer to each of claims 1, 7, and 8 of said Letters Patent.
[*Official Gazette June 8, 1937.*]